United States Patent
Friske et al.

(10) Patent No.: US 7,308,456 B2
(45) Date of Patent: Dec. 11, 2007

(54) METHOD AND APPARATUS FOR BUILDING ONE OR MORE INDEXES ON DATA CONCURRENT WITH MANIPULATION OF DATA

(75) Inventors: Craig Alan Friske, San Jose, CA (US); John Marland Garth, Gilroy, CA (US); Christina Marie Lee, San Jose, CA (US); James Ruddy, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 10/248,131

(22) Filed: Dec. 19, 2002

(65) Prior Publication Data

US 2004/0122842 A1    Jun. 24, 2004

(51) Int. Cl.
*G06F 17/30* (2006.01)
(52) U.S. Cl. .................................................. 707/102
(58) Field of Classification Search .............. 707/1, 707/2, 5, 10, 102, 200; 714/5, 15
See application file for complete search history.

(56) References Cited

U.S. PATENT DOCUMENTS

| | | | |
|---|---|---|---|
| 4,819,156 A * | 4/1989 | DeLorme et al. ............. | 714/15 |
| 4,868,744 A | 9/1989 | Reinsch et al. ........... | 364/280.3 |
| 5,842,196 A | 11/1998 | Agarwal et al. ............... | 707/2 |
| 5,842,208 A | 11/1998 | Blank et al. .................... | 707/7 |
| 5,897,641 A | 4/1999 | Ruddy et al. ............... | 707/202 |
| 5,920,854 A | 7/1999 | Kirsch et al. .................. | 707/3 |
| 6,026,412 A | 2/2000 | Sockut et al. ............... | 707/200 |
| 6,460,047 B1 | 10/2002 | Ambroziak ................. | 707/102 |

FOREIGN PATENT DOCUMENTS

| EP | 723238 | 7/1996 |
|---|---|---|
| EP | 0767435 A1 | 4/1997 |

OTHER PUBLICATIONS

Mohan et al., "Algorithms for Creating Indexes for Very Large Tables Without Quiescing Updates," *Proceedings of the ACM SIGMOD International Conference on Management of Data*, San Diego, California, Jun. 2-5, 1992, pp. 361-370.
Srinivasan et al., "Performance of On-line Index Construction Algorithms," *Proceedings of the 3rd International Conference on Extending Database Technology: Advances in Database Technology*, Mar. 23, 1992, pp. 293-309.

* cited by examiner

*Primary Examiner*—Etienne Leroux
(74) *Attorney, Agent, or Firm*—IP Authority, LLC; Ramraj Soundararajan

(57) ABSTRACT

One or more indexes are built on data (concurrent with manipulation of data) wherein the index build operation is done without restricting the manipulation of data. The index is brought to consistency with the data based upon processing recovery log records to simulate index manipulations during data insert, update, or delete operations.

8 Claims, 7 Drawing Sheets

METHOD AND APPARATUS FOR BUILDING ONE OR MORE INDEXES ON DATA CONCURRENT WITH MANIPULATION OF DATA

CROSS REFERENCE TO RELATED APPLICATIONS

This application is related to the application by Sockut et al. entitled "Interaction Between Application of a Log and Maintenance of a Table that Maps Records Identifiers During Online Reorganization of a Database", now U.S. Pat. No. 6,026,412, which is hereby incorporated by reference in its entirety, including any appendices and references thereto. This application is related to the application by Blank et al. entitled "High Performance Recover/Build Index System by Unloading Database Files in Parallel", now U.S. Pat. No. 5,842,208, which is hereby incorporated by reference in its entirety, including any appendices and references thereto.

BACKGROUND OF INVENTION

1. Field of Invention

The present invention relates generally to the field of indexing data. More specifically, the present invention is related to indexing data without suspending data manipulation.

2. Discussion of Prior Art

Current state-of-the-art-schemes for building a new index on data require that all insert, update, or delete operations (on the data) be suspended for the duration of the index build operation. The emphasis in such prior art schemes is on raw speed to reduce the amount of time the data is not available for manipulation.

FIG. 1 illustrates such a prior art scheme, wherein the scheme involves: (a) scanning a data set; (b) extracting an index key from each data record, (c) pairing the index key with a record identifier (also called a RID), (d) sorting the data by key and RID; and (e) building the index structure from these ordered key/RID pairs. In such prior art schemes, the amount of time in which the data is not available for manipulation may be considerable.

The references describe, in general, the procedure of indexing data. It should be noted that the prior art fails to teach, either directly or indirectly, the present invention's method for building indexes on data concurrent with the manipulation of data.

The U.S. patent to Ambroziac (U.S. Pat. No. 6,460,047 B1) provides for a technique for indexing data. The disclosed method describes compressing an index to obtain an index that is easily stored and transmitted. The disclosed invention also provides for the decompression of such a compressed index. One disclosed embodiment maintains a separate index for each document, thereby allowing for easy updating of indexes in response to changes in documents and easy transmission of indexes, which allows distributed searching. The claimed technique provides very compact indexing information, but allows the indexing information to be very rapidly processed.

The U.S. patent to Kirsch et al. (U.S. Pat. No. 5,920,854) provides for a real-time document collection search engine with phrase indexing. The disclosed collection search system is responsive to a user query against a collection of documents to provide a search report. The collection search system includes a collection index, including: (a) a first predetermined single word and multiple word phrases as indexed terms occurring in the collection of documents, (b) a linguistic parser that identifies a list of search terms from a user query, the linguistic parser identifying the list from second predetermined single words and multiple word phrases, and (c) a search engine coupled to receive the list from the linguistic parser.

The U.S. patent to Agarwal et al. (U.S. Pat. No. 5,842,196) provides for a database system and method for updating records such as are commonly used in a relational database environment. Updates are carried out in a manner which allows a substantial portion of the work to be performed in direct mode (when possible), thereby avoiding the inefficiency of re-reading records. In this fashion, a scenario which requires deferred updating, in accordance with the present invention, can be treated mostly as a direct update with minimal deferred updating.

The U.S. patent to Reinsch et al. (U.S. Pat. No. 4,868,744) provides for a method for restarting a long-running, fault-tolerant operation in a transaction-oriented database system without burdening-the system log. A restartable load without logging method permits the restart of a LOAD operation from the last COMMIT point without requiring the writing of images of loaded records to the log. Instead, the method logs only a minimal amount of information, recording positions within the data sets to be loaded and within the tablespace being loaded.

The European patent to Fuller (EP0767435 A1) provides for a transaction device driver technique for a journaling file system. The transaction device driver logs any updates as the data appears through normal read/write/strategy entry points into the driver and, should the system fail while there are outstanding operations, the driver ensures that either all or none of the changes for the operation will appear in the file system.

Whatever the precise merits, features, and advantages of the above-cited references, none of them achieves or fulfills the purposes of the present invention.

SUMMARY OF THE INVENTION

The present invention describes a method and apparatus for building a new index on data concurrent with insert, update, or delete operations where the amount of time in which the data is not available for manipulation may be approach-insignificant. According to the present invention's method, the data is scanned similar to a classic index build operation, but without restricting the manipulation of the data resulting in an index which is inconsistent with the current data content. The index is then brought to consistency with the data by processing the recovery log records for the data to simulate the index manipulations which normally occur during data insert, update, or delete operations.

DESCRIPTION OF THE PREFERRED EMBODIMENTS

Figure 1:
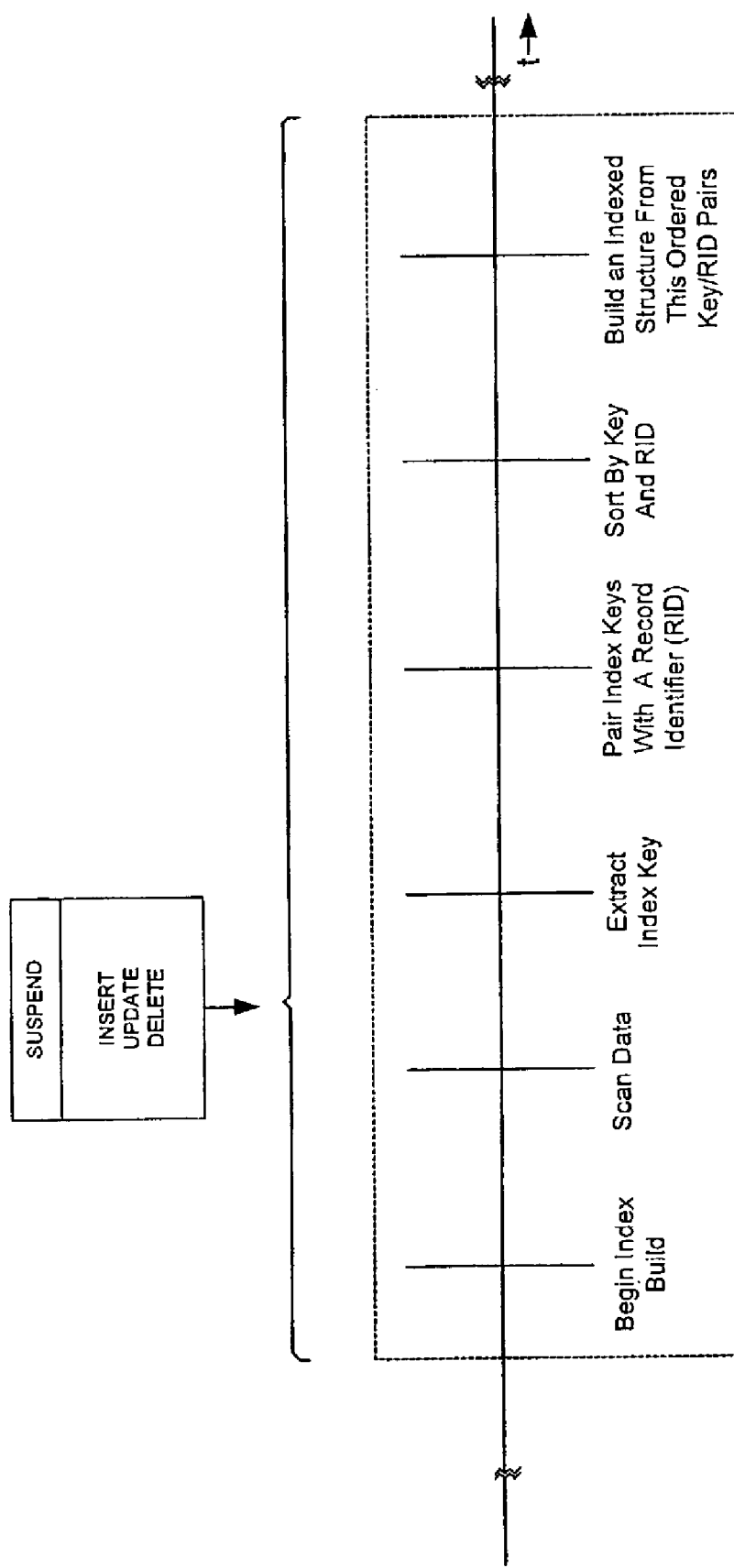
FIG. 1 illustrates a prior art scheme wherein the insert, update, and delete operations are suspended during an index build operation.

While this invention is illustrated and described in a preferred embodiment, the invention may be produced in many different configurations, forms, and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
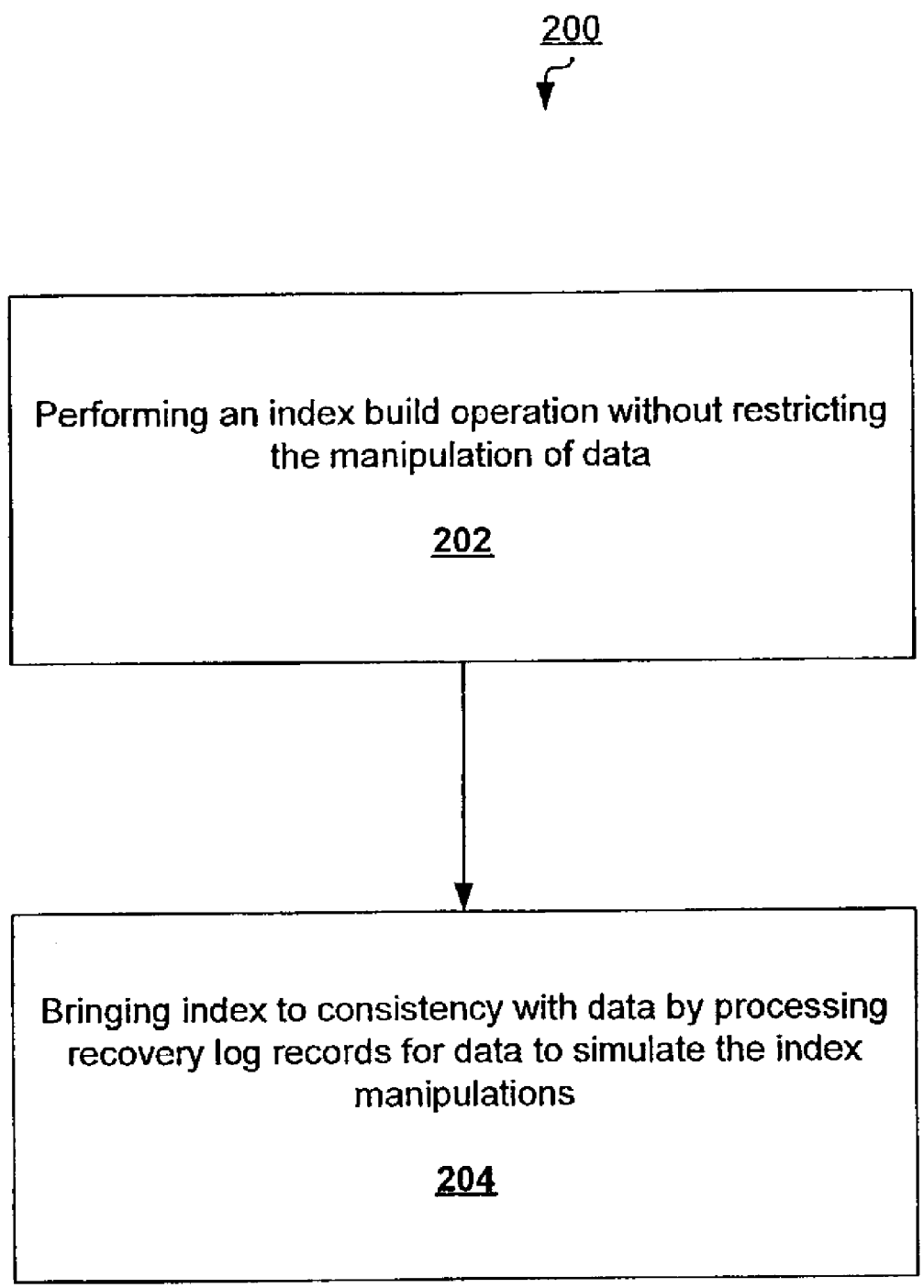
FIG. 2 illustrates a flow chart outlining a general overview of the exemplary embodiment of the present invention's method.

FIG. 2 illustrates a flow chart 200 outlining a general overview of the exemplary embodiment of the present invention's method. The method comprises: (a) performing an index build operation without restricting the manipulation of data resulting in an index which is inconsistent with current data content 202; and (b) bringing the index to consistency with the data by processing log records for data to simulate the index manipulations which normally occur during data insert, update, or delete operations 204.

Figure 3:
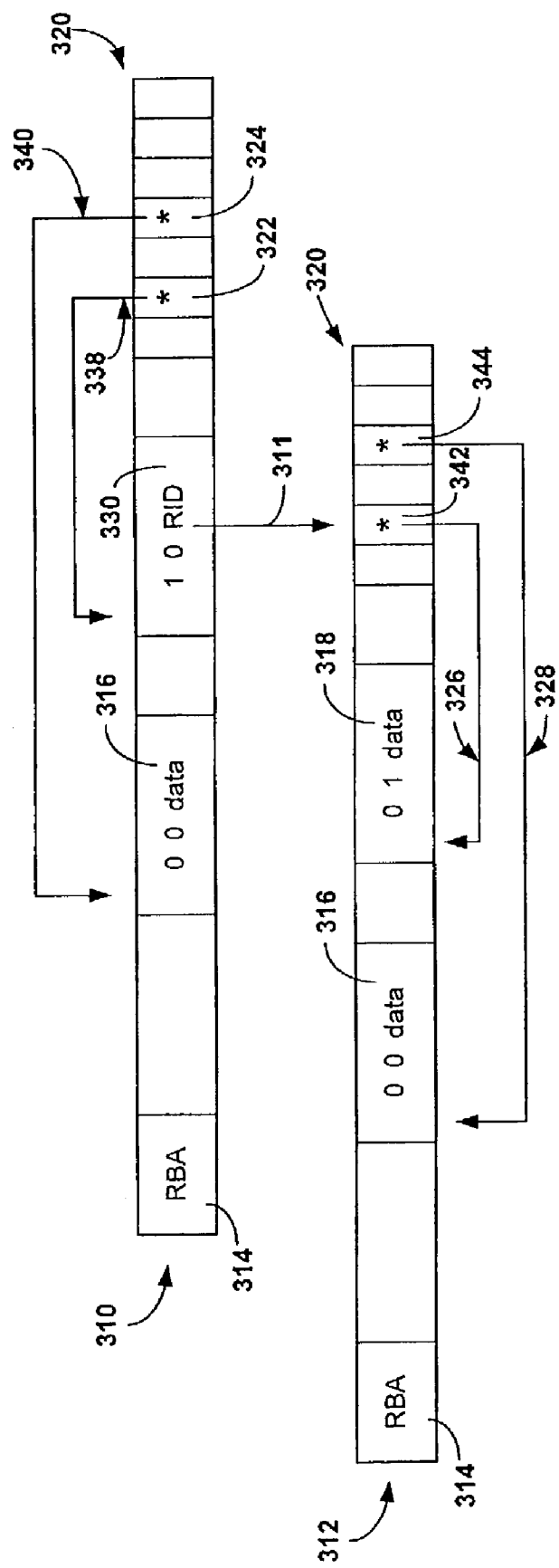
FIG. 3 illustrates the structure of file pages which includes a header indicating the position of the log.

In the preferred embodiment, the log is recorded as described in Sockut et al. (U.S. Pat. No. 6,026,412) (which is incorporated by reference). FIG. 3 illustrates the structure of file pages 310 and 312, which include a header indicating the position of the log. Each file page shown generally at 310 and 312 contains zero or more data records (shown generally as 316, 318, and 330), which DBMS allocates at the beginning of each of pages 310 and 312. There are three types of data records: regular (316), pointer (330), and overflow (318). The end of file pages 310 and 312 contains an ID map, shown generally at 320, which is an array of pointers (offsets of data records within the file page). "Slot" refers to the space (if any) to which an ID maps entry points. Specifically, in file page 310, an entry (shown as "*") in pointer 324 points to a slot for regular data record 316 and is shown generally as arrow 340; an entry in pointer 322 points to a slot for pointer data record 330 and is shown generally as arrow 338. In file page 312, an entry in pointer 344 points to a slot for regular data record 316 and is shown generally as arrow 328; an entry in pointer 342 points to a slot for overflow data record 318 and is shown generally as arrow 326. The header of each page includes the position in the log, i.e., the relative byte address (RBA 314) that was current when file page 310 or 312 was most recently written. Whenever users insert (I), update (U) or delete (D), DBMS records the activity in the log and thus increases the current RBA.

Figure 4:
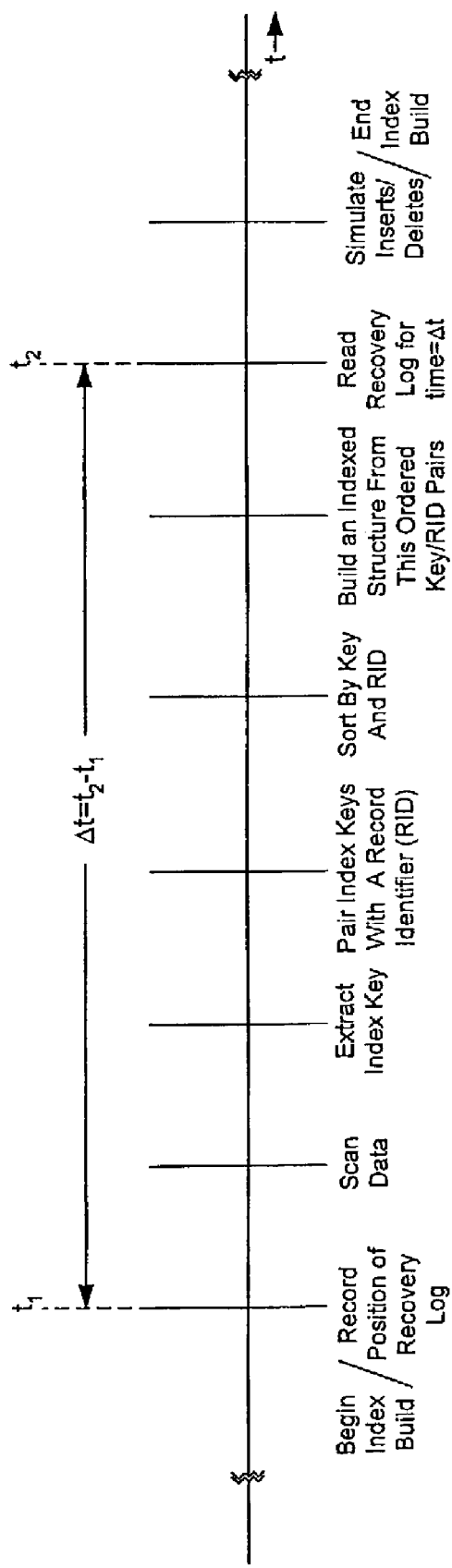
FIG. 4 illustrates a first embodiment of the present invention's method wherein the recovery log is used to simulate inserts and deletes.

FIG. 4 illustrates a first embodiment of the present invention's method. At the beginning of the index build operation, the current position of the recovery log is recorded and the data is scanned with regard to consistency (sometimes called a "fuzzy" read) to extract the index keys. It should be noted that the step of recording the position of the recovery log is envisioned to occur in close proximity to the step of scanning data. Index keys are paired with an identifier (e.g., record identifier or RID). The data is then sorted by key and RID. As a next step, the index is built (e.g., with parallelism as described in Blank, et al. in U.S. Pat. No. 5,842,208) from the sorted data. Next, the recovery log is read from the recorded point to the current point, extracting key, RID, and Log Record Sequence Number (LRSN) from the redo log records for simulating index inserts, and from the undo log records for simulating index deletes.

Figure 5:
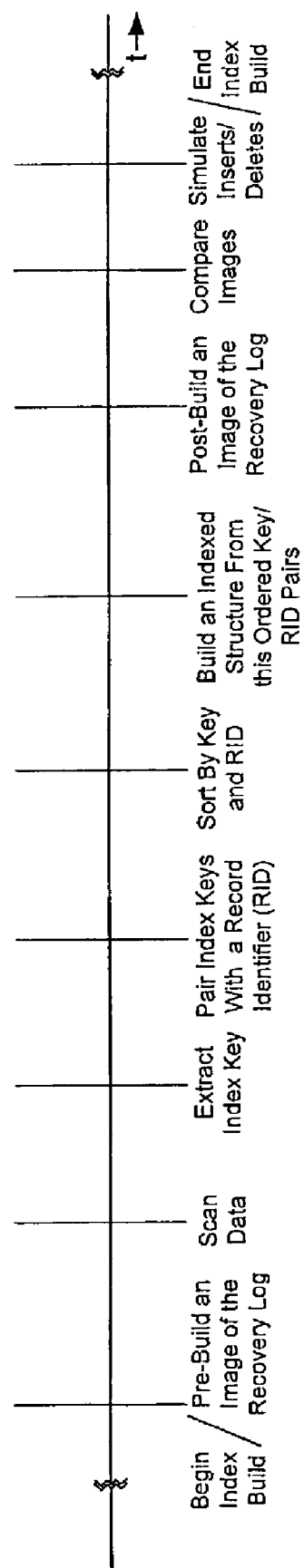
FIG. 5 illustrates a second embodiment of the present invention's method wherein the a pre- and post-build image of the recovery log is used to simulate inserts and deletes.

FIG. 5 illustrates another embodiment of the present invention's method. This embodiment applies to systems that optimize the information logged for updates and record only the changed portions of the data record posing a problem if the entire key value is not present in the log records. For these systems, the log must record full before and after data record images. The method of this embodiment tracks the method of FIG. 4, except an image (pre-build image) of the recovery log is recorded prior to scanning data and an image (post-build image) of the recovery log is recorded after the index building operation. The images are then compared to simulate inserts and deletes (thereby bringing the data to consistency).

Figure 6:
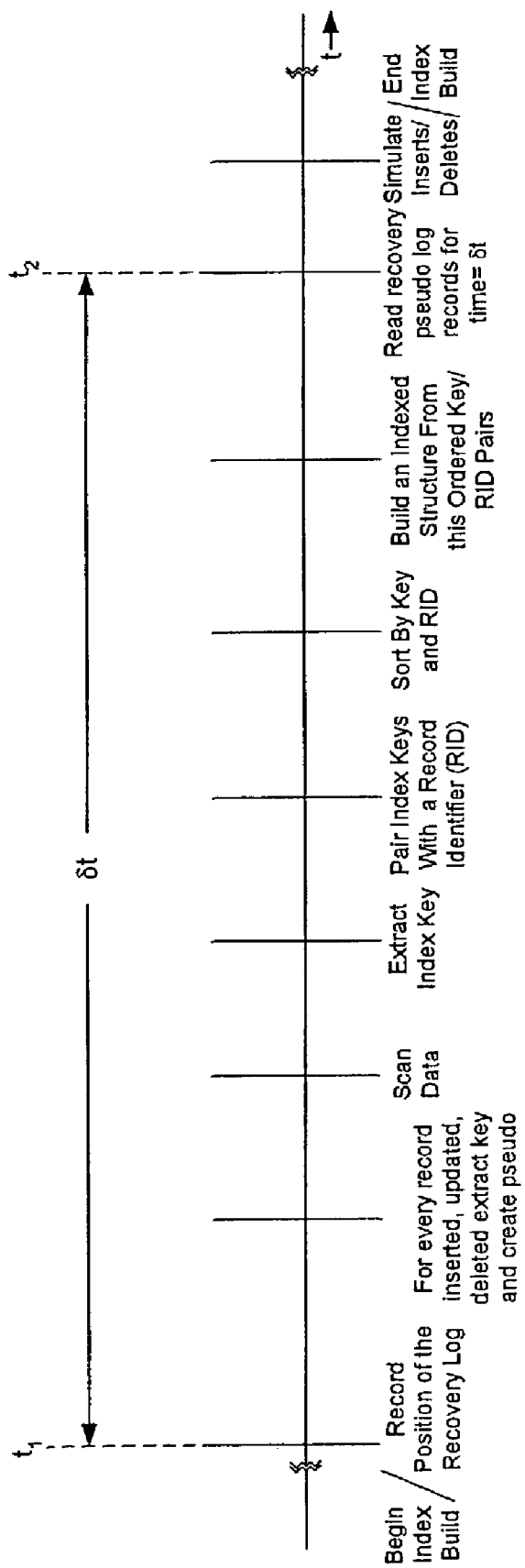
FIG. 6 illustrates an alternative embodiment wherein the system extracts the before and after key values and writes them to the log as if the index were being maintained automatically.

FIG. 6 illustrates an alternative embodiment wherein the system extracts the before and after key values and writes them to a pseudo log as if the index were being maintained automatically. The index key/RID/LRSN/operation sets are then sorted by key and LRSN, and then the key/RID insert or delete operations are applied to the index as needed. When all the log records are processed, then the operation is iterated from the last point in the recovery log to the current point until the system estimates that the next set of records can be processed within a user-specified time interval (δt). At this point, the insert, update, and delete operations on the data is halted until the last set is processed; then, the insert, update, and delete operations are resumed with automatic maintenance of the indexes enabled.

One key advantage is that log records are scanned for data changes after the fact. From the data changes, it is inferred that the changes that need to be made to update the index are built separately from the engine's ongoing index maintenance. The algorithm can run independently of the engine and is the approach which would be used by tool vendors. The present invention's solution avoids run-time memory logging.

Figure 7:
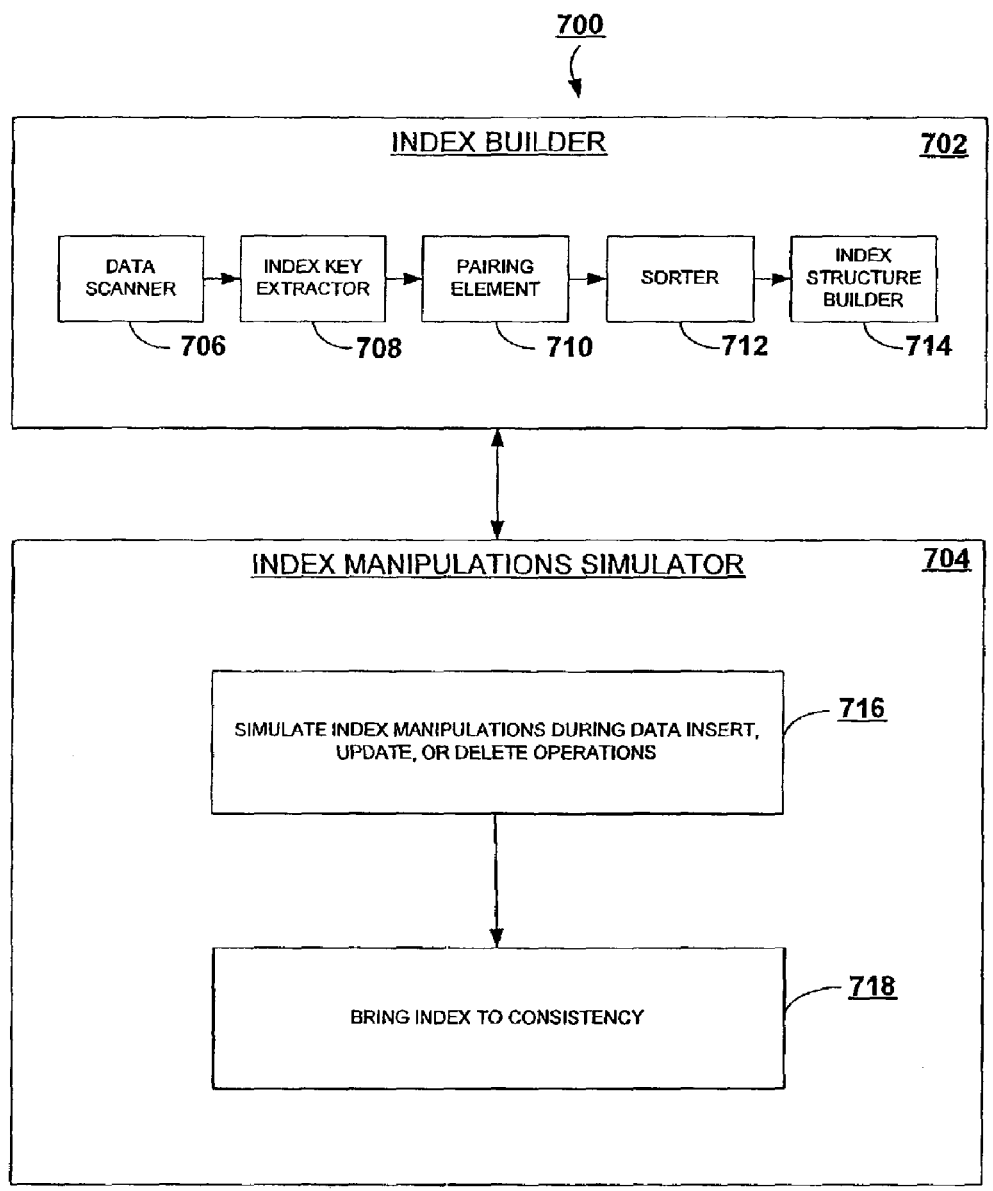
FIG. 7 illustrates an apparatus associated with the exemplary embodiment of the present invention.

FIG. 7 illustrates an apparatus 700 associated with the exemplary embodiment of the present invention, wherein apparatus 700 provides for building one or more indexes on data concurrent with the manipulation of data. The apparatus 700 comprises index builder 702 and index manipulations simulator 704. Index builder 702 performs an index build operation without restricting the manipulation of data and index manipulations simulator 704 brings the index to consistency with the data based upon processing recovery log records to simulate index manipulations during data operations.

Index builder 702 further comprises: data scanner 706 for scanning data; index key extractor 708 for extracting index keys from the scanned data; paring element 710 for paring the index keys with a record identifier; sorter 712 for sorting the index keys and record identifiers; and index structure builder 714 for building an indexed structure from the sorted index keys and record identifiers.

Index manipulations simulator 704 provides for: (a) simulating index manipulations during data insert, update, or delete operations 716; and (b) bringing index to consistency 718 using any of the three embodiments described in FIGS. 4-6.

Additionally, the present invention provides for an article of manufacture comprising computer readable program code contained within, implementing one or more modules for building one or more indexes on data concurrent with the manipulation of data. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code-based products are software modules for: (a) performing an index build operation without restricting the manipulation of data; and (b) bringing the index to consistency with said data based upon processing recovery log records to simulate index manipulations during data insert, update, or delete operations.

CONCLUSION

A method and apparatus has been shown in the above embodiments for the effective building of one or more indexes on data concurrent with the manipulation of data. While various preferred embodiments have been shown and described, it will be understood that there is no intent to limit the invention by such disclosure but, rather, it is intended to cover all modifications and alternate constructions falling within the spirit and scope of the invention, as defined in the appended claims. For example, the present invention should not be limited by a software/program, or computing environment.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A method for building one or more indexes on data in a database concurrent with manipulation of said data, said method comprising the steps of:
   a. performing an index build operation without suspending data operations on said data in said database, wherein said data operations are operations that insert, update, or delete said data in said database, said data operations recorded in recovery log records; and
   b. after said index build operation, bringing said one or more indexes to consistency with said data based upon processing said recovery log records to simulate index manipulations that would normally occur during said data operations.

2. A method as per claim 1, wherein said step of performing an index build further comprises the steps of:
   a. scanning data;
   b. extracting index keys from said scanned data;
   c. pairing said index keys with a record identifier;
   d. sorting said index keys and record identifiers; and
   e. building an indexed structure from said sorted index keys and record identifiers.

3. A method as per claim 2, wherein said step of bringing said one or more indexes to consistency further comprises the steps of:
   a. recording position of a recovery log in close proximity to said step of scanning data;
   b. reading recovery log from said recorded position to current position; and
   c. simulating index manipulations during data operations to bring consistency to said indexed structure.

4. An article of manufacture comprising computer usable medium having a computer readable program code for building one or more indexes on data in a database concurrent with manipulation of said data, said medium comprising:
   a. computer readable program code performing an index build operation without suspending data operations on said data in said database, wherein said data operations are operations that insert, update, or delete said data in said database, said data operations recorded in recovery log records; and
   b. computer readable program code bringing said one or more indexes to consistency with said data after said index build operation, based upon processing said recovery log records to simulate index manipulations that would normally occur during said data operations.

5. A method for building indexes on data in a database without restricting manipulation of said data, said method comprising the steps of:
   a. pre-building a recovery log image;
   b. scanning data;
   c. extracting index keys from said scanned data;
   d. pairing said index keys with a record identifier;
   e. sorting said index keys and record identifiers;
   f. building an indexed structure from said sorted index keys and record identifiers;
   g. post-building a recovery log image; and
   h. comparing said pre-built and post-built recovery log images to simulate index manipulations that would normally occur during data operations on said data in said database to bring consistency to said indexed structure; wherein:
   at least steps b-f are performed without suspending said data operations, wherein said data operations are operations that insert, update, or delete said data in said database.

6. An apparatus for building one or more indexes on data in a database concurrent with manipulations of said data, said apparatus comprising:
   a. an index builder performing index build operations without suspending data operations on said data in said database, wherein said data operations are operations that insert, update, or delete said data in said database, said data operations recorded in recovery log records; and
   b. an index manipulations simulator bringing said one or more indexes to consistency after performing said index build operations, with said data based upon processing said log records to simulate index manipulations that would normally occur during said data operations.

7. An apparatus for building one or more indexed on data concurrent with manipulations of said data, as per claim 6, wherein said index builder further comprises:

a. a data scanner scanning data;
b. an index key extractor extracting index keys from said scanned data;
c. a paring element pairing said index keys with a record identifier;
d. a sorter sorting said index keys and record identifiers; and
e. an index structure builder building an indexed structure from said sorted index keys and record identifiers.

8. An apparatus for building one or more indexed on data concurrent with manipulations of said data, as per claim 6, wherein said index manipulations simulator brings said one or more indexes to consistency by recording position of a recovery log, reading recovery log from said recorded position to a current position, and simulating index manipulations during data operations to bring said consistency to said data.

* * * * *